(12) United States Patent
Wen et al.

(10) Patent No.: US 8,001,130 B2
(45) Date of Patent: Aug. 16, 2011

(54) WEB OBJECT RETRIEVAL BASED ON A LANGUAGE MODEL

(75) Inventors: Ji-Rong Wen, Beijing (CN); Shuming Shi, Beijing (CN); Wei-Ying Ma, Beijing (CN); Yunxiao Ma, Beijing (CN); Zaiqing Nie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 191 days.

(21) Appl. No.: 11/459,857

(22) Filed: Jul. 25, 2006

(65) Prior Publication Data

US 2008/0027910 A1  Jan. 31, 2008

(51) Int. Cl.
*G06F 17/30* (2006.01)

(52) U.S. Cl. .................. 707/750; 707/999.006

(58) Field of Classification Search .................. 707/1–4, 707/10, 100, 750, 999.003, 999.006, 999.007, 707/730; 715/500
See application file for complete search history.

(56) References Cited

U.S. PATENT DOCUMENTS

| | | | |
|---|---|---|---|
| 5,594,911 A | 1/1997 | Cruz et al. | |
| 6,076,088 A | 6/2000 | Paik et al. | |
| 6,148,349 A | 11/2000 | Chow et al. | |
| 6,266,664 B1 * | 7/2001 | Russell-Falla et al. | 707/700 |
| 6,304,864 B1 | 10/2001 | Liddy et al. | |
| 6,353,825 B1 | 3/2002 | Ponte | |
| 6,418,434 B1 | 7/2002 | Johnson et al. | |
| 6,418,448 B1 | 7/2002 | Sarkar | |
| 6,493,706 B1 | 12/2002 | Mead et al. | |
| 6,519,580 B1 | 2/2003 | Johnson et al. | |
| 6,631,369 B1 | 10/2003 | Meyerzon et al. | |
| 6,665,665 B1 | 12/2003 | Ponte | |
| 6,965,903 B1 | 11/2005 | Agarwal et al. | |
| 6,996,778 B2 | 2/2006 | Rajarajan et al. | |
| 7,003,511 B1 * | 2/2006 | Antonov | 707/730 |
| 7,003,516 B2 * | 2/2006 | Dehlinger et al. | 707/750 |
| 7,058,913 B1 | 6/2006 | Siegel et al. | |
| 7,231,388 B2 * | 6/2007 | Matsubayashi et al. | 707/688 |
| 7,231,395 B2 * | 6/2007 | Fain et al. | 707/101 |
| 7,529,761 B2 | 5/2009 | Wen et al. | |
| 7,685,197 B2 * | 3/2010 | Fain et al. | 707/732 |
| 7,720,830 B2 | 5/2010 | Wen et al. | |
| 2003/0220906 A1 | 11/2003 | Chickering | |

(Continued)

FOREIGN PATENT DOCUMENTS

WO   WO 00/57311   9/2000

(Continued)

OTHER PUBLICATIONS

Arasu, Arvind and Hector Garcia-Molina, "Extracting Structured Data from Web Pages," SIGMOD 2003, San Diego, © 2003 ACM, 12 pages.

(Continued)

*Primary Examiner* — Marc R Filipczyk
(74) *Attorney, Agent, or Firm* — Perkins Coie LLP (57) ABSTRACT

A method and system is provided for determining relevance of an object to a term based on a language model. The relevance system provides records extracted from web pages that relate to the object. To determine the relevance of the object to a term, the relevance system first determines, for each record of the object, a probability of generating that term using a language model of the record of that object. The relevance system then calculates the relevance of the object to the term by combining the probabilities. The relevance system may also weight the probabilities based on the accuracy or reliability of the extracted information for each data source.

11 Claims, 9 Drawing Sheets

U.S. PATENT DOCUMENTS

| | | | |
|---|---|---|---|
| 2004/0034652 | A1 | 2/2004 | Hofmann et al. |
| 2004/0080549 | A1 | 4/2004 | Lord et al. |
| 2004/0181749 | A1 | 9/2004 | Chellapilla et al. |
| 2005/0108200 | A1 | 5/2005 | Meik et al. |
| 2006/0031211 | A1 | 2/2006 | Mizuno |
| 2006/0074881 | A1 | 4/2006 | Vembu et al. |
| 2006/0080353 | A1 | 4/2006 | Miloushev et al. |
| 2006/0098871 | A1 | 5/2006 | Szummer |
| 2006/0101060 | A1 | 5/2006 | Li et al. |
| 2006/0167928 | A1 | 7/2006 | Chakraborty et al. |
| 2006/0253437 | A1* | 11/2006 | Fain et al. .................. 707/5 |
| 2007/0150486 | A1 | 6/2007 | Wen et al. |
| 2010/0281009 | A1 | 11/2010 | Wen et al. |

FOREIGN PATENT DOCUMENTS

WO WO 00/73942 A2 12/2000

OTHER PUBLICATIONS

Arlotta, Luigi et al., "Automatic Annotation of Data Extracted from Large Web Sites," International Workshop on the Web and Databases, Jun. 2003, San Diego, 6 pages.

Balmin, Andrey, Vagelis Hristidis and Yannis Papakonstantinou, "ObjectRank: Authority-Based Keyword Search in Databases," Proceedings of the 30th VLDB Conference, Toronto, Canada, 2004, 12 pages.

Berger, Adam L., Stephen A. Della Pietra and Vincent J. Della Pietra, "A Maximum Entropy Approach to Natural Language Processing," Computational Linguistics, vol. 22, No. 1, © 1996 Association for Computational Linguistics, 36 pages.

Besag, Julian, "Spatial Interaction and the Statistical Analysis of Lattice Systems," Journal of the Royal Statistical Society, Series B, vol. 36, No. 2, 1974, pp. 192-236.

Bunescu, Razvan C. and Raymond J. Mooney, "Relational Markov Networks for Collective Information Extraction," Proceedings of the ICML 2004 Workshop on Statistical Relational Learning and its Connections to Other Fields (SLR-2004), Banff, Canada, Jul. 2004, 7 pages.

U.S. Appl. No. 11/305,500, Wen et al.

U.S. Appl. No. 11/461,400, Wen et al.

Buttler, David, Ling Liu and Calton Pu, "A Fully Automated Object Extraction System for the World Wide Web," Proceedings of IEEE ICDCS-21, 2001, 11 pages.

Cai, Deng et al., "VIPS: a Vision-based Page Segmentation Algorithm," Nov. 1, 2003, Microsoft Technical Report MSR-TR-2003-79, pp. 1-29.

Cai, Deng, Shipeng Yu, Ji-Rong Wen and Wei-Ying Ma, "Block-based Web Search," SIGIR'04, Sheffield, South Yorkshire, UK, © 2004 ACM, 8 pages.

Chang, Chia-Hui and Shao-Chen Lui, "IEPAD: Information Extraction Based on Pattern Discovery," WWW10, May, Hong Kong, © 2001 ACM, pp. 681-688.

Clarke, Charles L. A., "Controlling Overlap in Content-Oriented XML Retrieval," SIGIR'05, Salvador, Brazil, © 2005 ACM, 8 pages.

Collins, Michael, "Discriminative Training Methods for Hidden Markov Models: Theory and Experiments with Perceptron Algorithms," 2002, 8 pages.

Collins, Micheal, "Ranking Algorithms for Named-Entity Extraction: Boosting and the Voted Perceptron," Proceedings of the 40th Annual Meeting of the Association for Computational Linguistics, Philadelphia, Jul. 2002, pp. 489-496.

Crescenzi, Valter, Giansalvatore Mecca and Paolo Merialdo, "RoadRunner: Towards Automatic Data Extraction from Large Web Sites," Proceedings of the 27th VLDB Conference, Italy, 2001, 10 pages.

Embley, D.W., Y.S. Jian and Y.-K. Ng, "Record-Boundary Discovery in Web Documents," In Proceedings of SIGMOD'99, 1999, pp. 1-24.

Fagin, Ronald et al., "Searching the Workplace Web," WWW2003, Budapest, Hungary, ACM, 10 pages.

Fine, Shai, Yoram Singer and Naftali Tishby, "The Hierarchical Hidden Markov Model: Analysis and Applications," Machine Learning, vol. 32, 1998, © 1998 Kluwer Academic Publishers, pp. 41-62.

Gravano, Luis and Hector Garcia-Molina, "Generalizing GLOSS to Vector-Space Databases and Broker Hierachies," Proceedings of the 21st VLDB Conference, Zurich, Switzerland, 1995, 12 pages.

He, Xuming et al., "Multiscale Conditional Random Fields for Image Labeling," Proceedings of the 2004 IEEE Computer Society Conference on Computer Vision and Pattern Recognition, pp. 1-8.

Jensen, F. V., S. L. Lauritzen and K. G. Olesen, "Bayesian Updating in Causal Probabilistic Networks by Local Computations," Computational Statistics Quarterly 4, 1990, © Physica-Verlag, pp. 269-282.

Kamps, Jaap et al., "Length Normalization in XML Retrieval," SIGIR'04, Sheffield, South Yorkshire, UK, © 2004 ACM, 8 pages.

Kobayashi, Mei and Koichi Takeda, "Information Retrieval on the Web," ACM Computing Surveys, vol. 32, No. 2, Jun. 2000, pp. 144-173.

Kschischang, Frank R., Brendan J. Frey and Hans-Andrea Loeliger, "Factor Graphs and the Sum-Product Algorithm," IEEE Transactions on Information Theory, vol. 47, No. 2, Feb. 2001, © 2001 IEEE, pp. 498-519.

Kumar, Sanjiv and Martial Hebert, "Discriminative Fields for Modeling Spatial Dependencies in Natural Images," Advances in Neural Information Processing Systems, NIPS 16, 2004, 8 pages.

Kumar, Sanjiv and Martial Hebert, "Discriminative Random Fields: A Discriminative Framework for Contextual Interaction in Classification," Proceedings of the 2003 IEEE International Conference on Computer Vision, vol. 2, 2003, 8 pages.

Kushmerick, Nicholas, "Wrapper induction: Efficiency and expressiveness," Mar. 10, 1999, Artificial Intelligence 118, 2000, © 2000 Elsevier Science B.V., pp. 15-68.

Laender, Alberto et al., "A Brief Survey of Web Data Extraction Tools," ACM SIGMOD Record, 31 (2), 2002, 10 pages.

Lafferty, John, Andrew McCallum and Fernando Pereira, "Conditional Random Fields: Probabilistic Models for Segmenting and Labeling Sequence Data," In Proceedings of ICML 2001, 8 pages.

Lalmas, Mounia, "Dempster-Shafer's Theory of Evidence applied to Structured Documents: modelling Uncertainty," SIGIR 1997, Philadelphia, Pennsylvania, © 1997 ACM, pp. 110-118.

Leek, Timothy Robert, "Information Extraction Using Hidden Markov Models," University of California, San Diego Computer Science Thesis Paper, 1997, 44 pages.

Lerman, Kristina et al., "Using the Structure of Web Sites for Automatic Segmentation of Tables," SIGMOD 2004, Paris, © 2004 ACM, 12 pages.

Lerman, Kristina, Steven N. Minton and Craig A. Knoblock, "Wrapper Maintenance: A Machine Learning Approach," Journal of Artificial Intelligence Research 18, 2003, © 2003 AI Access Foundation and Morgan Kaufmann Publishers, pp. 149-181.

Li, Jia, Amir Najmi and Robert M. Gray, "Image Classification by a Two-Dimensional Hidden Markov Model," Jul. 4, 1999, IEEE Transactions on Signal Processing, vol. 48, No. 2, Feb. 2000, © 2000 IEEE, pp. 517-533.

Libra. An Object-level Academic Search Engine. http://libra.direct-taps.net [last accessed Nov. 13, 2006].

Liu, Bing and Yanhong Zhai, "NET—A System for Extracting Web Data from Flat and Nested Data Records," Proceedings of 6th International Conference on Web Information Systems Engineering (WISE-05), 2005, 8 pages.

Liu, Bing, Robert Grossman & Yanhong Zhai, "Mining Data Records in Web Pages," SIGKDD'03, Washington, DC, © 2003 ACM, pp. 601-606.

Liu, Dong C. and Jorge Nocedal, "On the Limited Memory BFGS Method for Large Scale Optimization," Mathematical Programming 45, 1989, pp. 503-528.

Malouf, Robert, "A comparison of algorithms for maximum entropy parameter estimation," In Proceedings of the 6th Conference on Natural Language Learning 2002, pp. 49-55.

McCallum, Andrew, Dayne Freitag and Fernando Pereira, "Maximum Entropy Markov Models for Information Extraction and Segmentation," Proc. ICML 2000, pp. 591-598.

Muslea, Ion, Steven Minton and Craig A. Knoblock, "Hierarchical Wrapper Induction for Semistructured Information Sources," Sep. 10, 1999, © 1999 Kluwer Academic Publishers, pp. 1-28.

Nie, Zaiqing et al, "Object-Level Ranking: Bringing Order to Web Objects," WWW 2005, Chiba, Japan, 8 pages.

Ogilvie, Paul and Jamie Callan, "Combining Document Representations for Known-Item Search," SIGIR'03, Toronto, Canada, © 2003 ACM, pp. 143-150.

Peng, Fuchun and Andrew McCallum, "Accurate Information Extraction from Research Papers using Conditional Random Fields," 2004, Proceedings of Human Language Technology Conference and North American Chapter of the Association for Computational Linguistics, 8 pages.

Robertson, Stephen, Hugo Zaragoza and Michael Taylor, "Simple BM25 Extension to Multiple Weighted Fields," CIKM'04, Washington DC, © 2004 ACM, pp. 42-49.

Sha, Fei and Fernando Pereira, "Shallow Parsing with Conditional Random Fields," Proceedings of Human Language Technology, NAACL 2003, 8 pages.

Skounakis, Marios, Mark Craven and Soumya Ray, "Hierarchical Hidden Markov Models for Information Extraction," Proceedings of the 18th International Joint Conference on Artificial Intelligence, Acapulco, Mexico, Morgan Kaufmann, 2003, 7 pages.

Song, Ruihua et al., "Learning Block Importance Models for Web Pages," WWW 2004, New York, pp. 203-211.

Sutton, Charles, Khashayar Rohanimanesh and Andrew McCallum, "Dynamic Conditional Random Fields: Factorized Probabilistic Models for Labeling and Segmenting Sequence Data," Proceedings of the 21st International Conference on Machine Learning, Banff, Canada, 2004, 8 pages.

Taskar, Ben, Pieter Abbeel and Daphne Koller, "Discriminative Probabilistic Models for Relational Data," In Proceedings of the 18th Conference on Uncertainty in Artificial Intelligence, 2002, 8 pages.

Tejeda, Sheila et al., "Learning Domain-Independent String Transformation Weights for High Accuracy Object Identification," SIGKDD'02, Edmonton, Alberta, Canada, © 2002 ACM, 10 pages.

Wang, Jiying and Frederick H. Lochovsky, "Data Extraction and Label Assignment for Web Databases," WWW 2003, Budapest, Hungary, ACM, pp. 187-196.

Wilkinson, Ross, "Effective Retrieval of Structured Documents," SIGIR 1994, pp. 311-317.

Xu, Jinxi and Jamie Callan, "Effective Retrieval with Distributed Collections," SIGIR'98, Melbourne, Australia, © 1998 ACM, 9 pages.

Yi, Lan, Bing Liu and Xiaoli Li, "Eliminating Noisy Information in Web Pages for Data Mining," SIGKDD'03, Washington D.C., © 2003 ACM, 10 pages.

Yu, Shipeng et al., "Improving Pseudo-Relevance Feedback in Web Information Retrieval Using Web Page Segmentation," WWW 2003, Hungary, ACM, 8 pages.

Yu, Stella X., Tai Sing Lee and Takeo Kanade, "A Hierarchical Markov Random Field Model for Figure-Ground Segregation," EMMCVPR 2001, © Springer-Verlag Berlin Heidelberg 2001, pp. 118-133.

Zhai, Yanhong and Bing Liu, "Web Data Extraction Based on Partial Tree Alignment," WWW 2005, Chiba, Japan, ACM, 10 pages.

Zhao, Hongkun et al., "Fully Automatic Wrapper Generation for Search Engines," WWW 2005, Chiba, Japan, ACM, 10 pages.

Zhu, Jun et al., "2D Conditional Random Fields for Web Information Extraction," Proceedings of the 22nd International Conference on Machine Learning, Germany, 2005, 8 pages.

Pinto, David et al., "Table Extraction Using Conditional Random Fields," SIGIR'03, Jul. 28-Aug. 1, © 2003 ACM.

Zhu, Jun et al., "Simultaneous Record Detection and Attribute Labeling in Web Data Extraction," KDD'06, Aug. 20-23, 2006, Philadelphia, Pennsylvania, copyright 2006 ACM.

Freitag, Dayne and Andrew Kachites McCallum, "Information Extraction with HMMs and Shrinkage," 1999, In Proceedings of the AAAI-99 Workshop on Machine Learning for Information Extraction, 6 pages.

Marchiori, Massimo, "The limits of Web metadata, and beyond," 1998, The World Wide Web Consortium, MIT Laboratory for Computer Science, 9 pages.

Ratnaparkhi, Adwait, "A Maximum Entropy Model for Part-Of-Speech Tagging," 1996, University of Pennsylvania, Dept. of Computer and Information Science, pp. 133-142.

Westerveld, Thijs et al., "Retrieving Web Pages Using Content, Links, URLs and Anchors," 2001, University of Twente, The Netherlands, 10 pages.

Ponte, Jay M. and W. Bruce Croft, "A Language Modeling Approach to Information Retrieval," SIGIR'98, Melbourne, Australia, © 1998 ACM.

Orlin, James, "Contentment in Graph Theory: Covering Graphs with Cliques," 1977.

Alba, Richard D, "A Graph-Theoretic Definition of a Sociometric Clique," Gordon and Breach Science Publishers, vol. 3, 1973.

Erdos, P. "Graph Theory and Probability," 1960.

Berge, Claude, "Two Theorems in Graph Theory," 1957.

\* cited by examiner

FIG. 4 unstructured object table (401)

| record | content | ... | data source |
|---|---|---|---|
| 0 | | | |
| 1 | | | |
| N | | | | structured object table (402)

| record | a1 | a2 | ... | am | data source |
|---|---|---|---|---|---|
| 0 | | | | | |
| 1 | | | | | |
| N | | | | | |

WEB OBJECT RETRIEVAL BASED ON A LANGUAGE MODEL

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, a search engine service may maintain a mapping of keywords to web pages. The search engine service may generate this mapping by "crawling" the web (i.e., the World Wide Web) to extract the keywords of each web page. To crawl the web, a search engine service may use a list of root web pages and identify all web pages that are accessible through those root web pages. The keywords of any particular web page can be extracted using various well-known information retrieval techniques, such as identifying the words of a headline, the words supplied in the metadata of the web page, the words that are highlighted, and so on. The search engine service may calculate a score that indicates how to rank the web pages based on the relevance of each web page to the search request, web page popularity (e.g., Google's PageRank), and so on. The search engine service then displays to the user the links to those web pages in the order indicated by the scores.

A web page may contain information about various types of objects such as products, people, papers, organizations, and so on, which are referred to as "web objects." For example, one web page may contain a product review of a certain model of camera, and another web page may contain an advertisement offering to sell that model of camera at a certain price. As another example, one web page may contain a journal article, and another web page may be the homepage of an author of the journal article. A person who is searching for information about an object may need information that is contained in different web pages. For example, a person who is interested in purchasing a certain camera may want to read reviews of the camera and to determine who is offering the camera at the lowest price.

To obtain such information, a person would typically use a search engine to find web pages that contain information about the camera. The person would enter a search query that may include the manufacturer and model number of the camera. The search engine then identifies web pages that match the search query and presents those web pages to the user in an order that is based on how relevant the content of each web page is to the search query. The person would then need to view the various web pages to find the desired information. For example, the person may first try to find web pages that contain reviews of the camera. After reading the reviews, the person may then try to locate a web page that contains an advertisement for the camera at the lowest price.

To make it easier to access information about web objects, many systems have been developed to extract information about web objects from web pages. Web pages often allocate a record for each object that is to be displayed. For example, a web page that lists several cameras for sale may include a record for each camera. Each record contains attributes of the object such as an image of the camera, its make and model, and its price. The extraction of such information can be difficult because web pages contain a wide variety of layouts of records and layouts of attributes within records.

Users can submit queries to a search system to locate information about web objects of interest in a manner similar to how users submit queries to locate web pages of interest. When a user submits a query to locate web object information, traditional database-type retrieval techniques can be used to search for a web object with attributes that match the query. These traditional techniques when applied to web objects are not particularly effective because they assume that the underlying data is reliable. The extraction of web object information can, however, be unreliable for several reasons. First, it can be difficult to precisely identify the record or the portion of a web page that corresponds to a web object. For example, it can be difficult to determine whether adjacent text represents data for the same object or two different objects. If a record is not identified correctly, then the identification of the attributes will likely not be correct. Second, even if the identification of a record is correct, the attributes of the record may still be incorrectly identified. For example, it can be difficult to determine whether a certain number in a record corresponds to the weight of the product, a dimension of the product, and so on. Third, the data source that provides the web page may itself provide unreliable data. For example, a web page advertising a product may simply have wrong information such as the wrong manufacturer for a certain model number of television. Because of this unreliability of extracted web object information, systems that perform searches based on extracted information on web objects often do not provide satisfactory results.

SUMMARY

A method and system is provided for determining relevance of an object to a term based on a language model. The relevance system provides records extracted from web pages that relate to the object. To determine the relevance of the object to a term, the relevance system first determines, for each record of the object, a probability of generating that term using a language model of the record of that object. The relevance system then calculates the relevance of the object to the term by combining the probabilities. The relevance system may also weight the probabilities based on the accuracy or reliability of the extracted information for each data source. A search system can use the relevance system to calculate relevance of an object to a query by calculating the relevance of the object to each term of the query and then combining the relevances for each term into a relevance for the query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for determining relevance of an object to a term based on a language model factoring in accuracy of extracted information relating to the object is provided. In one embodiment, the relevance system provides records extracted from web pages that relate to the object. For example, the relevance system may extract a record from each of 10 web pages for a particular make and model of a television. The relevance system may also identify the attributes of the records. The collection of all the terms of a record may be considered to be an unstructured representation of the object, and the attributes of the record may be considered to be a structured representation of the object. To determine the relevance of the object to a term, the relevance system first determines, for each record of the object, a probability of generating that term using a language model of the record of that object. A language model provides a probability distribution of terms or sequences of terms occurring in documents that conform to the language model. The relevance system considers each record of an object to be a document and the collection of records for multiple (e.g., all) objects to be a corpus of documents relating to that object. The relevance system also provides metrics indicating the accuracy or reliability of the extracted information for each data source. The relevance system may provide a record accuracy metric that rates how accurately the records of a certain data source can be identified. The relevance system may also provide an attribute accuracy metric that rates how accurately the attributes of a certain data source can be identified. The record accuracy metric and the attribute accuracy metric may both factor in a data accuracy metric, which indicates reliability of the data provided by the data source. The relevance system then calculates the relevance of the object to the term by combining the probabilities of the records, factoring in the accuracy of the data sources of the records. For example, an accuracy metric may range from 0 to 1 with 1 indicating a high accuracy. The relevance system may then add the probabilities of the records weighted by the accuracy metric of the data source of the record. Thus, a record from an inaccurate data source will have very little effect on the relevance of the object, whereas a record from an accurate data source will have a significant effect on the relevance of the object. A search system can use the relevance system to calculate relevance of an object to a query by calculating the relevance of the object to each term of the query and then combining the relevances for each term into a relevance for the query. In this way, the relevance system calculates the relevance of an object to a term by factoring in the accuracy of the extracted information relating to the object. The relevance system may also determine relevance of an object to a query based on a language model without factoring in the accuracy of the extracted information. Conversely, the relevance system may determine relevance of an object to a query factoring in the accuracy of the extracted information without using a language model.

In one embodiment, the relevance system calculates the probability of an object being relevant to a term based on an analysis of each record as a collection of terms (record-level probability), of each attribute as a collection of terms (attribute-level probability), or of a combination of records as a collection of terms and attributes as a collection of terms (hybrid probability). The relevance system calculates the record-level probability for each record of an object using a language model that treats each record as a document that contains the terms of the record and the corpus of documents including the records of multiple objects. The relevance system then weights the probability of each record by the record accuracy of the data source of the record and adds the weighted probabilities together.

The relevance system calculates the attribute-level probability for each record using a different language model for each attribute of the object. For example, if an object representing a product has the attributes of product description and product manufacturer, then the relevance system will have one language model for the product description attribute and another for the product manufacturer attribute. The relevance system treats the attribute of each record as a document that contains the terms of that attribute and the corpus of documents including the terms of the attributes of records of multiple objects. For example, if an object has a product manufacturer attribute and 10 records have been extracted, the relevance system considers the terms of the manufacturer attribute of each record to be a separate document, resulting in 10 separate documents. The relevance system then uses the language model of each attribute to calculate a probability of generating that term using a language model for the attribute of each record of the object. Thus, the relevance system generates a probability for each attribute of each record. The relevance system then combines the probabilities of the attributes for each record to give a probability for that record. For example, if an object has the attributes of product description, product manufacturer, and product model number, the relevance system calculates an attribute probability for each attribute for a record and adds them together to give an overall record probability for the record being relevant to the term. The relevance system may weight the attribute probabilities based on how important the attribute is to the information content of the record. For example, a model number attribute may be very important because an exact match between a term and the model number may indicate a high degree of relevance, whereas a color attribute may not be very important because an exact match between a term and the color may not be particularly relevant. The relevance system then combines the record probabilities to give a probability of the object being relevant to the term. The relevance system may weight the record probabilities based on the accuracy of the data source of the record before combining the probabilities.

The relevance system calculates the hybrid probability for each record using a different language model for each attribute of the object and factoring in the importance of each attribute based on the accuracy of the data source. The relevance system calculates attribute probabilities as described above for attribute-level probabilities. The relevance system, however, weights the attribute probabilities based on importance to the extent that the data source accurately identifies attributes. If a data source has a high attribute accuracy, then the relevance system weights the attribute probabilities by the importance. If a data source, however, has a low attribute accuracy, the relevance system weights the attributes equally under the assumption that one inaccurate attribute should not be weighted more heavily than another inaccurate attribute. If a data source has a medium attribute accuracy, the relevance system weights the attributes somewhere between the importance of the attribute and an equal importance for all the attributes of the record.

The relevance system may use accuracy information related to a data source that is based on a person's objective assessment of the accuracy. To determine the record accuracy, people may review web pages of a data source and records extracted from web pages and enter what they think is an appropriate value for the record accuracy metric for that data source. The metrics may then be averaged or in some other way combined to give a final metric. The attribute accuracy and the data accuracy of the data source may be determined in a similar manner. Alternatively, the relevance system may use an automated accuracy assessment. For example, a classifier may be trained to automatically assess the accuracy of the data source.

Language models typically determine the relevance of a document to a query based on the probability of generating the query from the language model of the document, as represented by the following equation:

$$P(D|Q) \propto P(Q|D) \cdot P(D) \quad (1)$$

where D represents the document, Q represents the query, and P(A|B) represents the probability of A given B. If the terms of the query are assumed to be independent, then the relevance system represents the probability of generating a query from the language model of the document by the following equation:

$$P(Q|D) = \prod_{i=1}^{|Q|} P(w_i|D) \quad (2)$$

where $w_i$ represents the ith term of Q, |Q| represents the length of Q, and $P(w_i|D)$ represents the probability of generating term $w_i$ from the language model of D.

The relevance system represents the probability of generating a term from a language model of a document by the following equation:

$$P(w|D) = \lambda \cdot \frac{tf(w, D)}{|D|} + (1-\lambda) \cdot \frac{tf(w, C)}{|C|} \quad (3)$$

where |D| represents the length of document D, tf(wD) represents the term frequency (i.e., number of occurrences) of term w in D, |C| represents the number of occurrences of terms in the whole collection, and tf(w,C) represents the term frequency of term w in the whole collection C. The parameters represents a Dirichlet smoothing and can have a value between 0 and 1. The relevance system may let the parameter λ rely on document length |D| as represented by the following equation:

$$\lambda = \frac{|D|}{|D| + \mu} \quad (4)$$

where μ represents a parameter that may be set based on the average document length in the collection.

The relevance system calculates the relevance of an object to a term based on record-level probabilities according to the following equation:

$$p(w|o) = \sum_{k=1}^{K} (\alpha_k P(w|R_k)) \quad (5)$$

where o represents the object, $P(w|R_k)$ represents the probability of generating w from the record $R_k$, K is the number of records for the object o, and $\alpha_k$ is the record accuracy such that $$\sum_k \alpha_k = 1.$$

The relevance system calculates $P(w|R_k)$ by treating each record $R_k$ as a document. Therefore, by using Equation 3, the relevance system represents $P(w|R_k)$ by the following equation:

$$P(w|R_k) = \lambda \frac{tf(w, R_k)}{|R_k|} + (1-\lambda) \frac{tf(w, C)}{|C|} \quad (6)$$

where C is the collection of all the records for all the objects.

The relevance system calculates the relevance of an object to a term based on attribute-level probabilities according to the following equation:

$$P(w|O) = \sum_{k=1}^{K} \left( \alpha_k \gamma_k \sum_{j=1}^{M} \beta_j P(w|O_{jk}) \right) \quad (7)$$

where $\gamma_k$ represents the attribute accuracy, $\alpha_k \gamma_k$ represents a normalized accuracy of both the record accuracy and attribute accuracy of record k such that $$\sum_k \alpha_k \gamma_k = 1,$$

M represents the number of attributes, $\beta_j$ represents the importance of the attribute j such that $$\sum_j \beta_j = 1,$$

$O_{jk}$ represents the value of the attribute j of the record k, and $P(w|O_{jk})$ represents the probability of generating w from the attribute j of record k. The relevance system calculates $P(w|O_{jk})$ treating each $O_{jk}$ as a document. Therefore, by using Equation 3, the relevance system represents $P(w|O_{jk})$ by the following equation:

$$P(w|O_{jk}) = \lambda \cdot \frac{tf(w, O_{jk})}{|O_{jk}|} + (1-\lambda) \cdot \frac{tf(w, C_j)}{|C_j|} \quad (8)$$

where $C_j$ represents the collection of all the attributes j of all records of all objects in a collection of objects.

The relevance system calculates the relevance of an object to a term based on hybrid probabilities according to the following equation:

$$P(w|O) = \sum_{k=1}^{K} \left( \alpha_k \sum_{j=1}^{M} \left( \gamma_k \beta_j + (1-\gamma_k)\frac{1}{M} \right) P(w|O_{jk}) \right) \quad (9)$$

The relevance system thus weights $P(w|O_{jk})$ between the importance of attribute j and an equal weighting based on the attribute accuracy.

Figure 1:
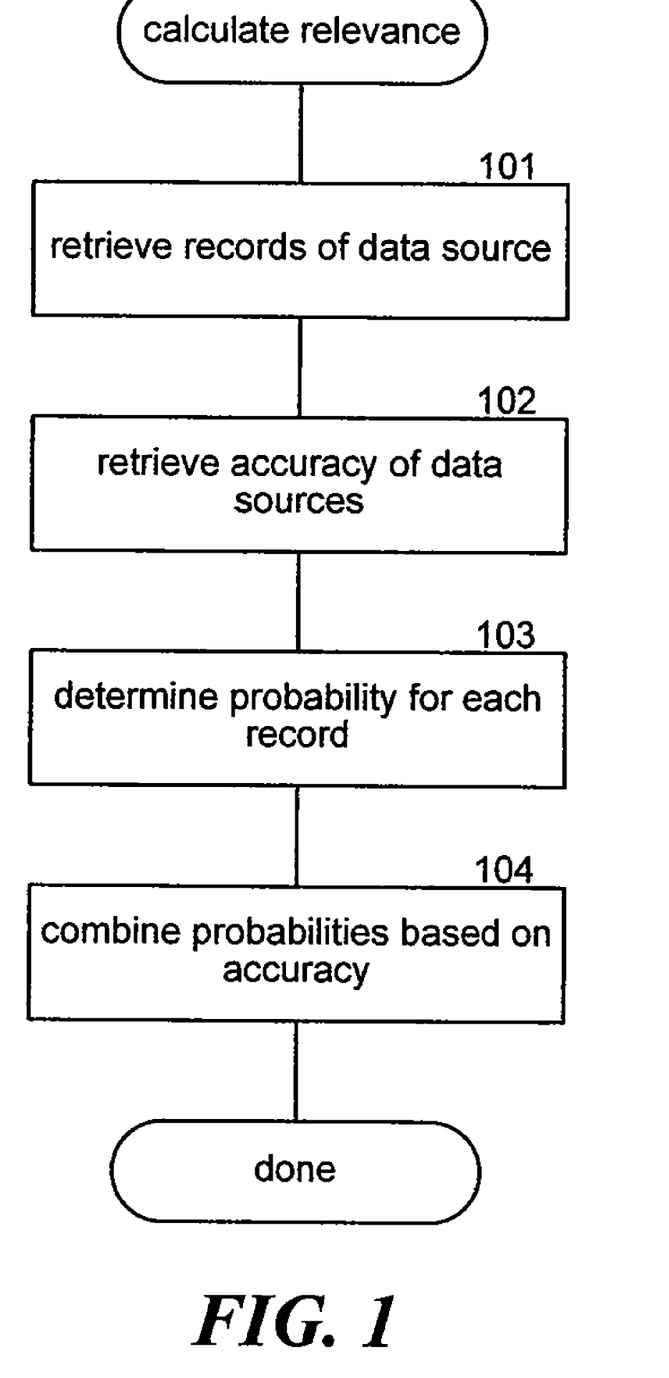
FIG. 1 is a flow diagram that illustrates high-level processing of a calculate relevance component of the relevance system in one embodiment.

FIG. 1 is a flow diagram that illustrates high-level processing of a calculate relevance component of the relevance system in one embodiment. The component calculates the relevance of an object to a term. In block 101, the component retrieves the records of various data sources for various objects. In block 102, the component retrieves the accuracy of the data sources. The accuracies may include a record accuracy and an attribute accuracy that each factor in the data accuracy of the data source. In block 103, the component determines for each record of the object the probability that the record is relevant to the term. In block 104, the component combines the probabilities to give an overall probability that the object is relevant to the term. The component may weight the probabilities when combining them based on the accuracies of their data sources.

Figure 2:
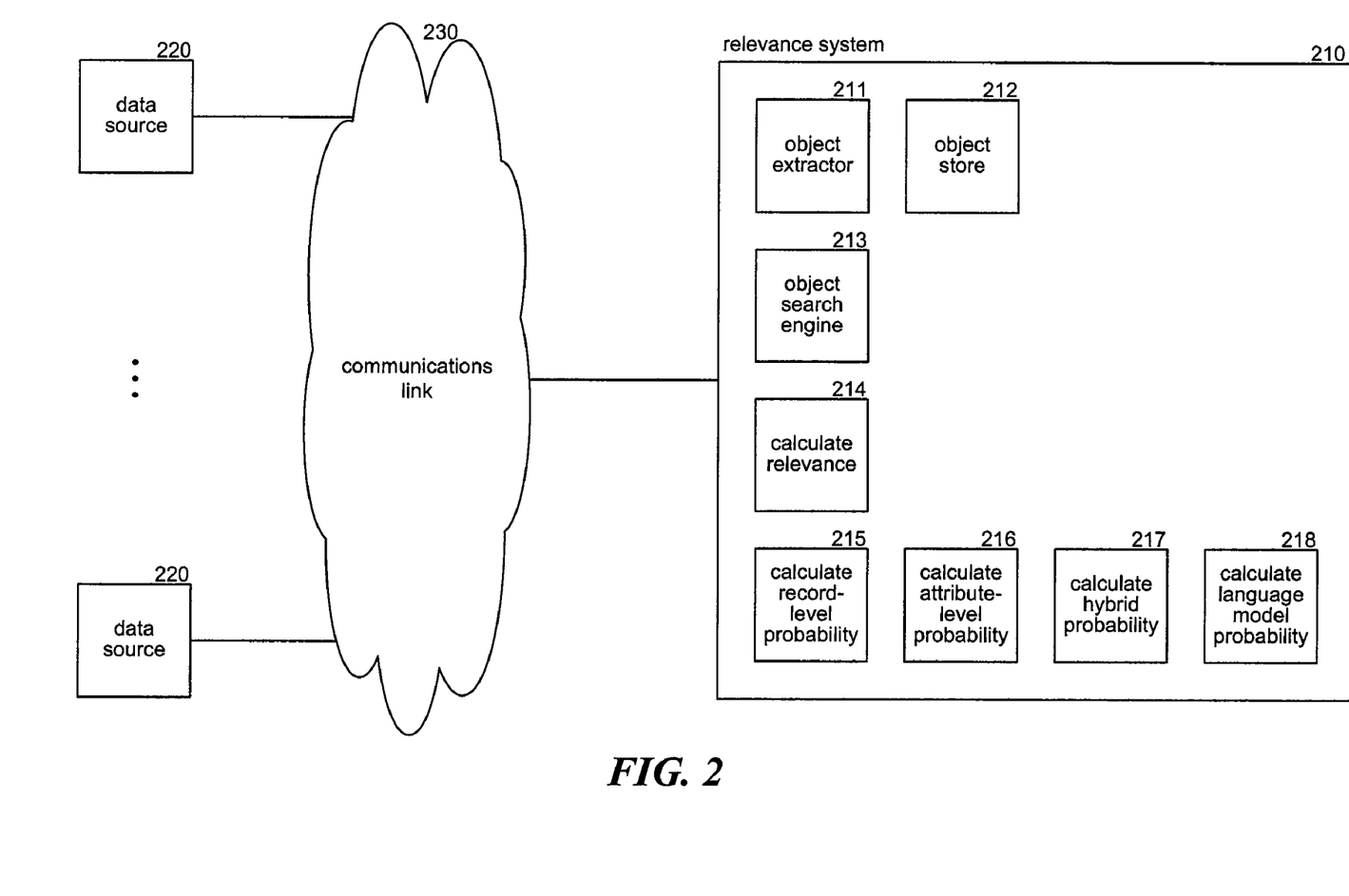
FIG. 2 is a block diagram that illustrates components of the relevance system in one embodiment.

FIG. 2 is a block diagram that illustrates components of the relevance system in one embodiment. The relevance system 210 may be connected to various data sources 220 via communications link 230. The data sources may be web sites that serve web pages that contain web objects, file servers that contain documents having objects, and so on. The relevance system may include an object extractor component 211 and an object store 212. The object extractor component may crawl the data sources and extract object information as records and attributes within records. The object extractor component may identify objects, group record information for the same object, and store the record information in the object store. The relevance system may also include an object search engine 213, a calculate relevance component 214, a calculate record-level probability component 215, a calculate attribute-level probability component 216, a calculate hybrid probability component 217, and a calculate language model probability component 218. The object extractor component and object search engine may be implemented on separate computing system and not be part of the relevance system. The object search engine may receive a query from a user and search the object store for objects that are related to the query. To determine the relevance of an object to the query, the object search engine invokes the calculate relevance component. The object search engine then combines the relevances to give an overall probability that the object is related to the query. The relevance system may use either the calculate record-level probability component, the calculate attribute-level probability component, or the calculate hybrid probability component for calculating the probability that the object is relevant to a term. The calculate language model probability component implements the language model for a document (e.g., record or attribute). The relevance system may also include a store that contains the record accuracy, attribute accuracy, and data accuracy of the various data sources.

Figure 3:
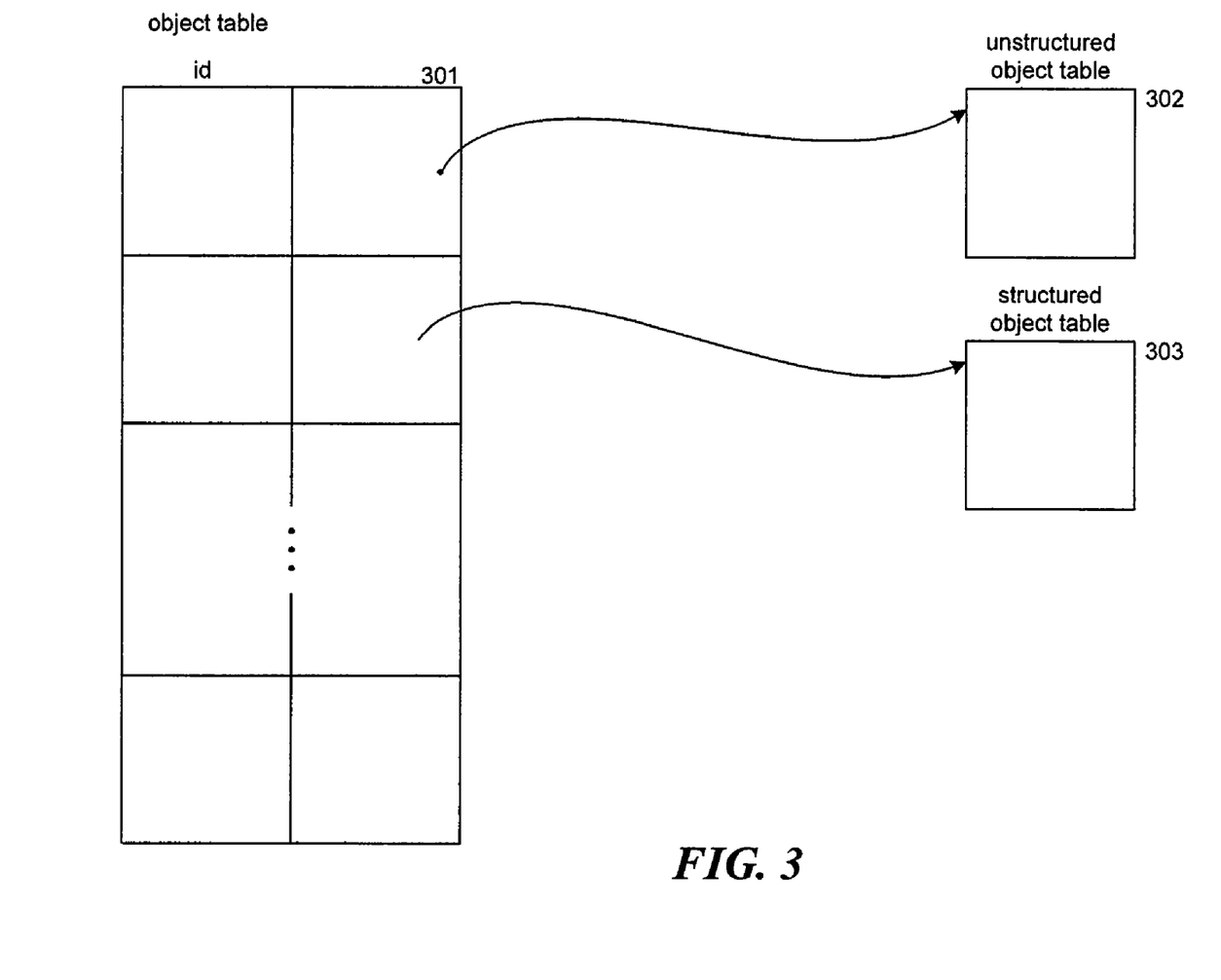
FIG. 3 is a block diagram that illustrates a data structure of the object store in one embodiment.
Figure 4:
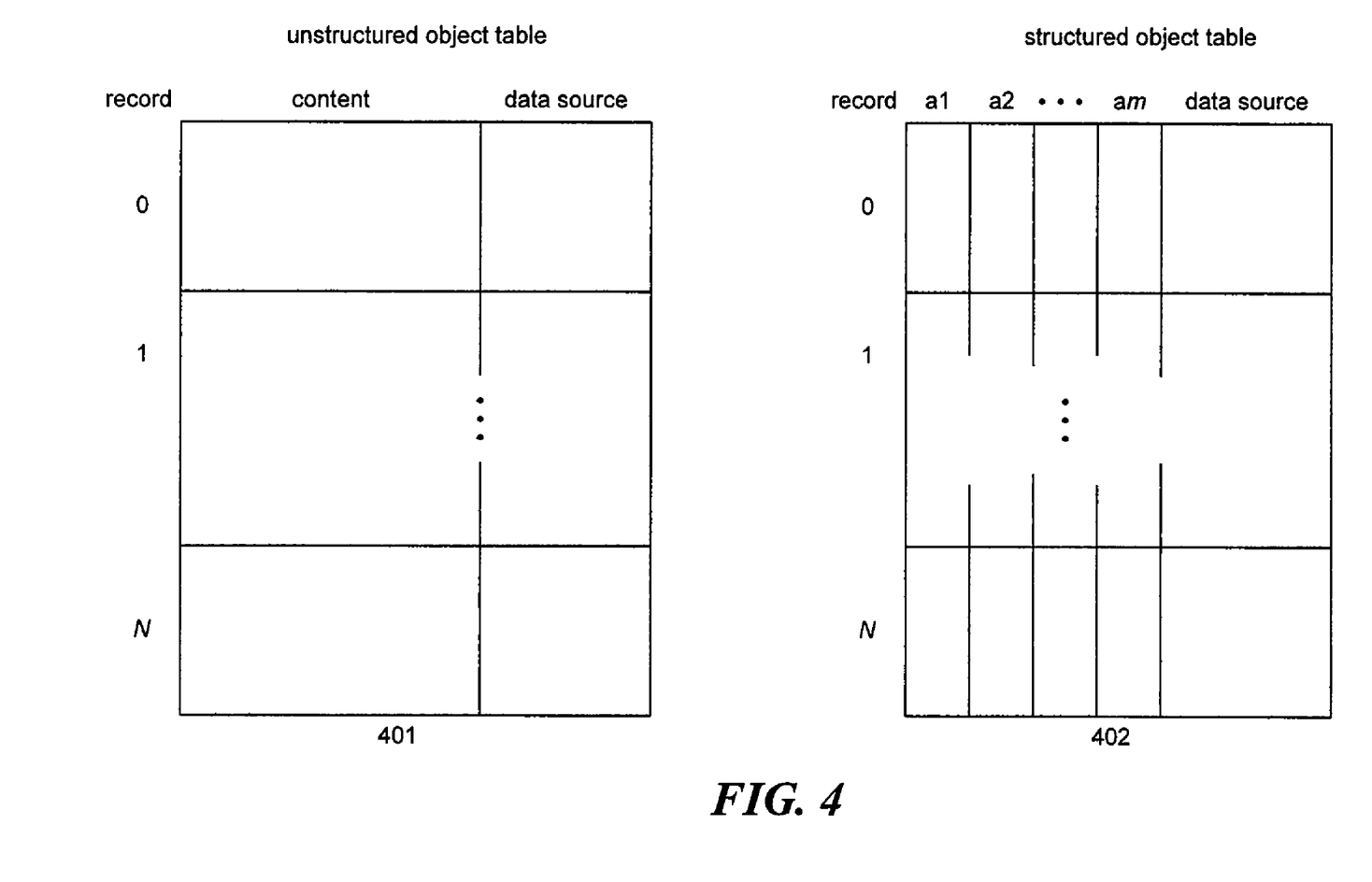
FIG. 4 is a block diagram that illustrates a structured and an unstructured object table in one embodiment.

FIG. 3 is a block diagram that illustrates a data structure of the object store in one embodiment. The data structure is an object table 301 that contains an entry for each object. Each entry includes an identifier of the object plus a reference to a structured object table 303 or unstructured object table 302 depending on whether the information extracted from data sources for the object is structured or unstructured. The extractor component populates the object table as it crawls the data sources. FIG. 4 is a block diagram that illustrates a structured and an unstructured object table in one embodiment. An unstructured object table 401 contains an entry for each record identified for the object. Each entry contains the content of the record and an indication of the data source. The content of the record includes all the terms (e.g., words and numbers) from the portion of the document (e.g., web page) that is identified as the record. A structured object table 402 contains an entry for each record identified for the object. Each entry contains a field for each attribute and an indication of the data source. Each field contains the value of the corresponding attribute that is identified from the portion of the document that is identified as the record. These data structures represent a logical organization of the data. The data structures may be implemented using various well-known techniques such as link lists, hash tables, and so on.

The computing devices on which the relevance system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the relevance system. In addition, the data structures and message structures may be stored or transmitted via a data transmission medium, such as a signal on a communications link. Various communications links may be used, such as the Internet, a local area network, a wide area network, or a point-to-point dial-up connection.

The relevance system may be used to monitor configuration in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The relevance system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
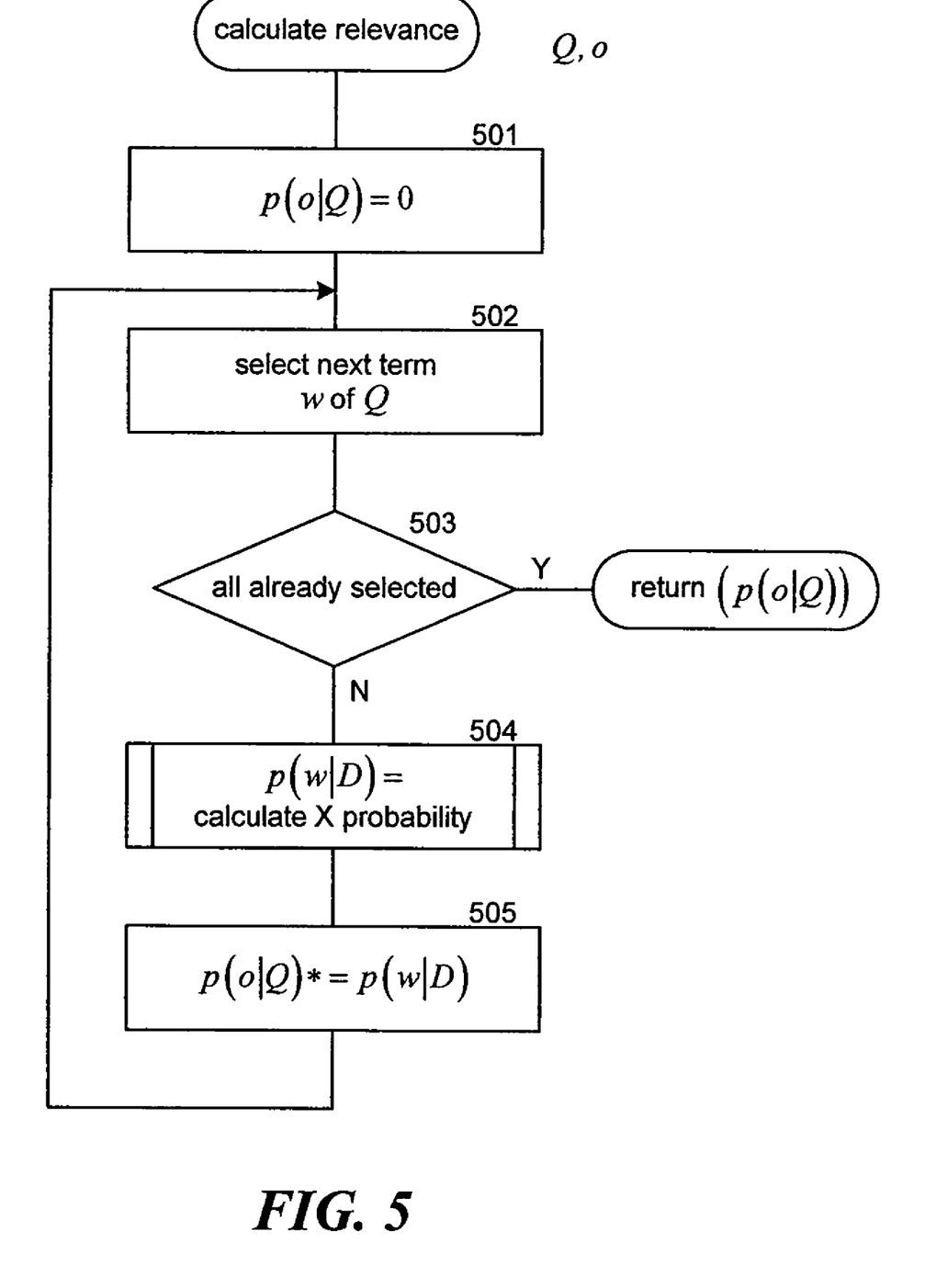
FIG. 5 is a flow diagram that illustrates low-level processing of the calculate relevance component of the relevance system in one embodiment.

FIG. 5 is a flow diagram that illustrates low-level processing of the calculate relevance component of the relevance system in one embodiment. The component is passed a query and an object and calculates the relevance of the object to the query. In block 501, the component initializes to zero a probability that a language model for the object will generate the query. In blocks 502-505, the component loops calculating a probability for each term within the query and accumulating the probability for the query. In block 502, the component selects the next term of the query. In decision block 503, if all the terms have already been selected, then the component returns the probability of the query, else the component continues at block 504. In block 504, the component invokes a calculate probability component to calculate the probability that the language model for the document will generate the term. The component may invoke the record-level component, the attribute-level component, or the hybrid component. In block 505, the component accumulates the probability for the term into a probability for the query and then loops to block 502 to select the next term.

Figure 6:
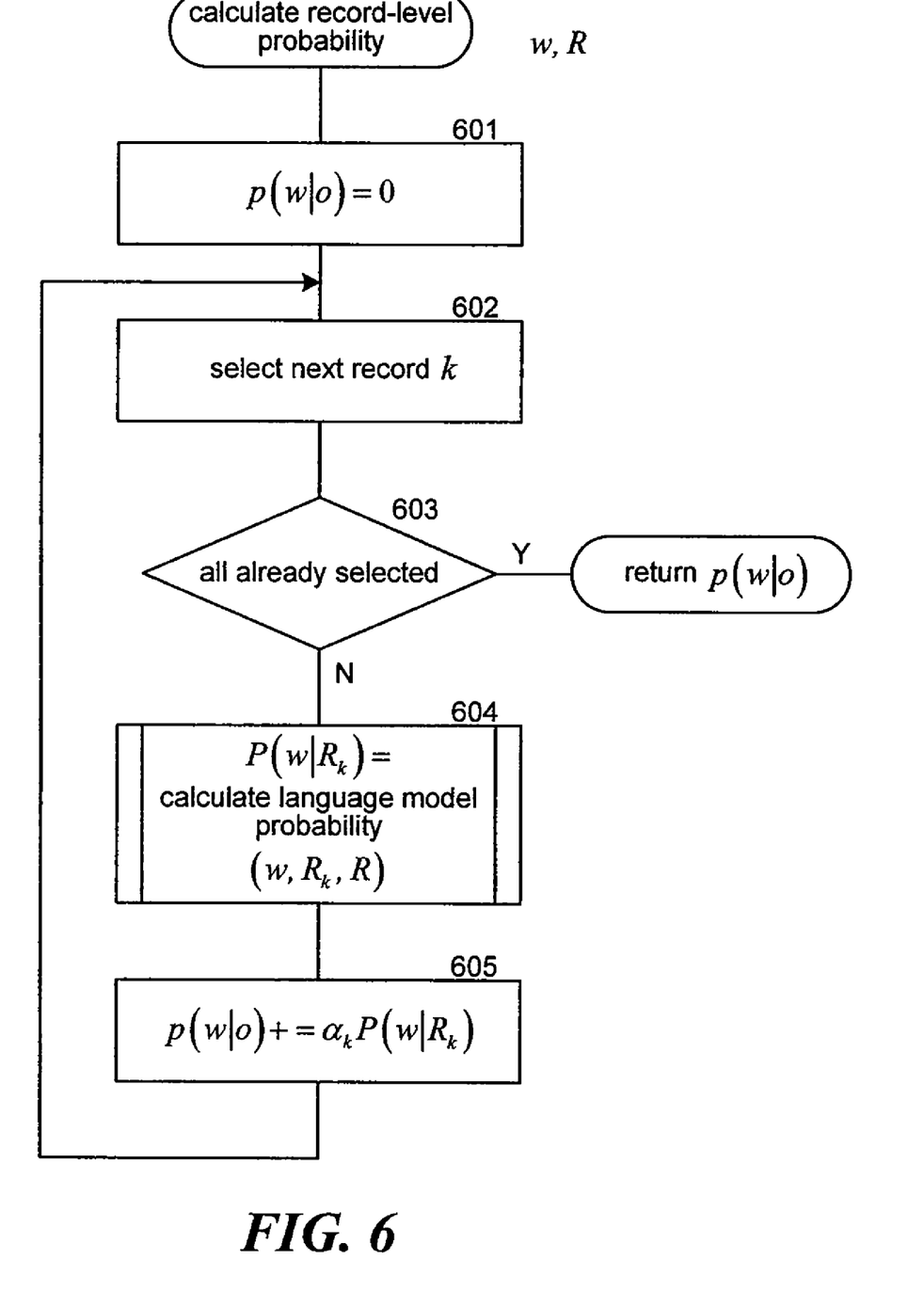
FIG. 6 is a flow diagram that illustrates the processing of the calculate record-level probability component in one embodiment.

FIG. 6 is a flow diagram that illustrates the processing of the calculate record-level probability component in one embodiment. The component is passed a term and an object and calculates the probability that the object is relevant to the term. In block 601, the component initializes a probability of relevance to zero. In blocks 602-605, the component loops accumulating the probability for each record of the object. In block 602, the component selects the next record of the object. In decision block 603, if all the records have already been selected, then the component returns the probability, else the component continues at block 604. In block 604, the component invokes a calculate language model probability component to calculate a record-level probability that the language model for the record will generate the term. In block 605, the component accumulates the record level probabilities weighted by the record accuracy of the data source into a probability for the object and then loops to block 602 to select the next record.

Figure 7:
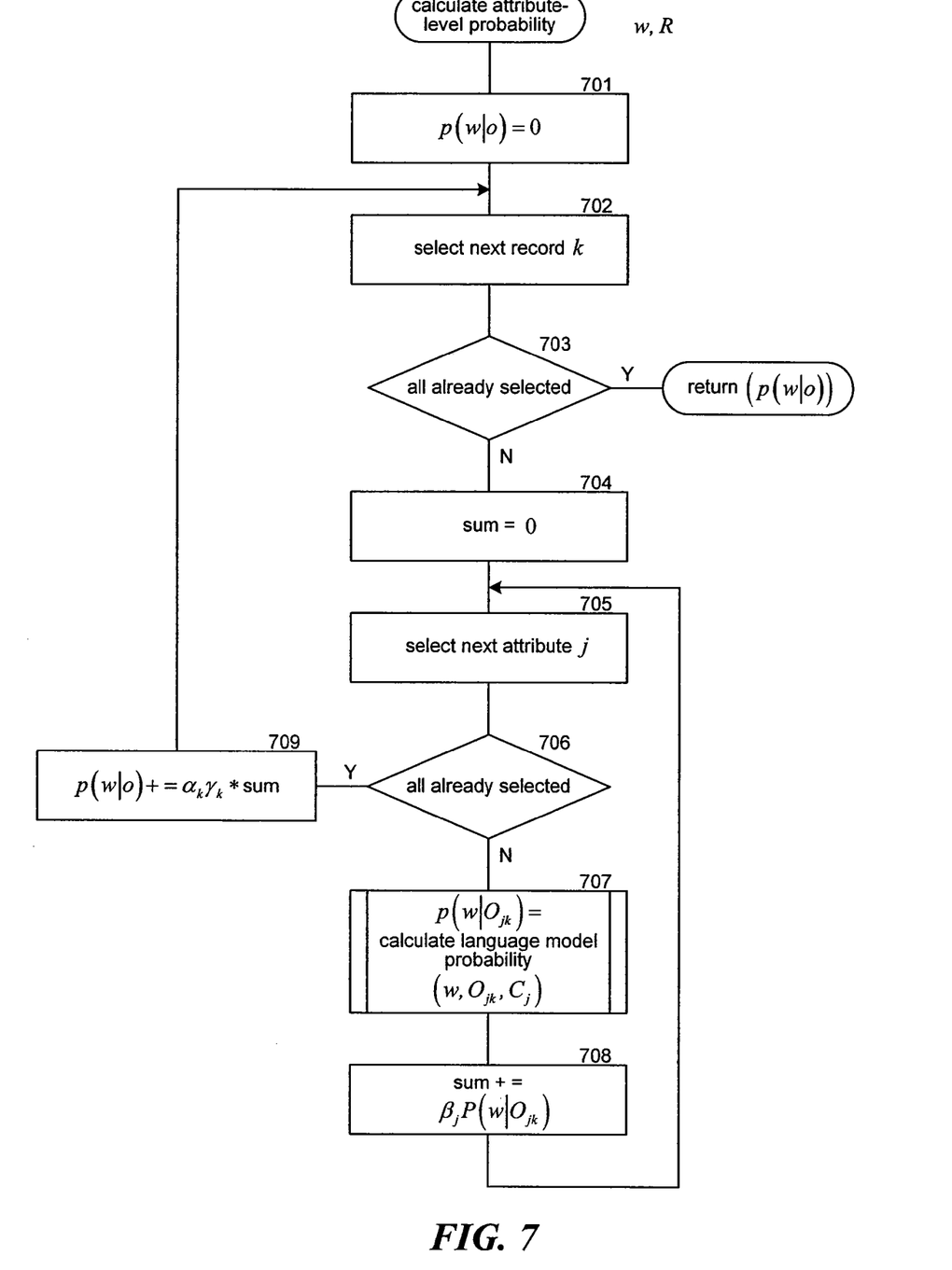
FIG. 7 is a flow diagram that illustrates the processing of the calculate attribute-level probability component of the relevance system in one embodiment.

FIG. 7 is a flow diagram that illustrates the processing of the calculate attribute-level probability component of the relevance system in one embodiment. The component is passed a term and an object and calculates the probability that the object is relevant to the term. In block 701, the component initializes the probability to zero. In blocks 702-709, the component loops selecting each record for the object and each attribute within each record to accumulate the probability for the object. In block 702, the component selects the next record of the object. In decision block 703, if all the records have already been selected, then the component returns the probability of the object, else the component continues at block 704. In block 704, the component initializes a sum of the contribution of the probabilities of the attributes of the selected record to zero. In block 705, the component selects the next attribute of the selected record. In decision block 706, if all the attributes of the selected record have already been selected, then the component continues at block 709, else the component continues at block 707. In block 707, the component invokes the calculate language model probability component to calculate the probability that a language model of the attribute will generate the term. In block 708, the component aggregates the probabilities of the attributes weighted by the importance of the attributes and then loops to block 705 to select the next attribute. In block 709, the component aggregates the sum of the attributes weighted by the record accuracy and attribute accuracy into the probability for the object and then loops to block 702 to select the next record.

Figure 8:
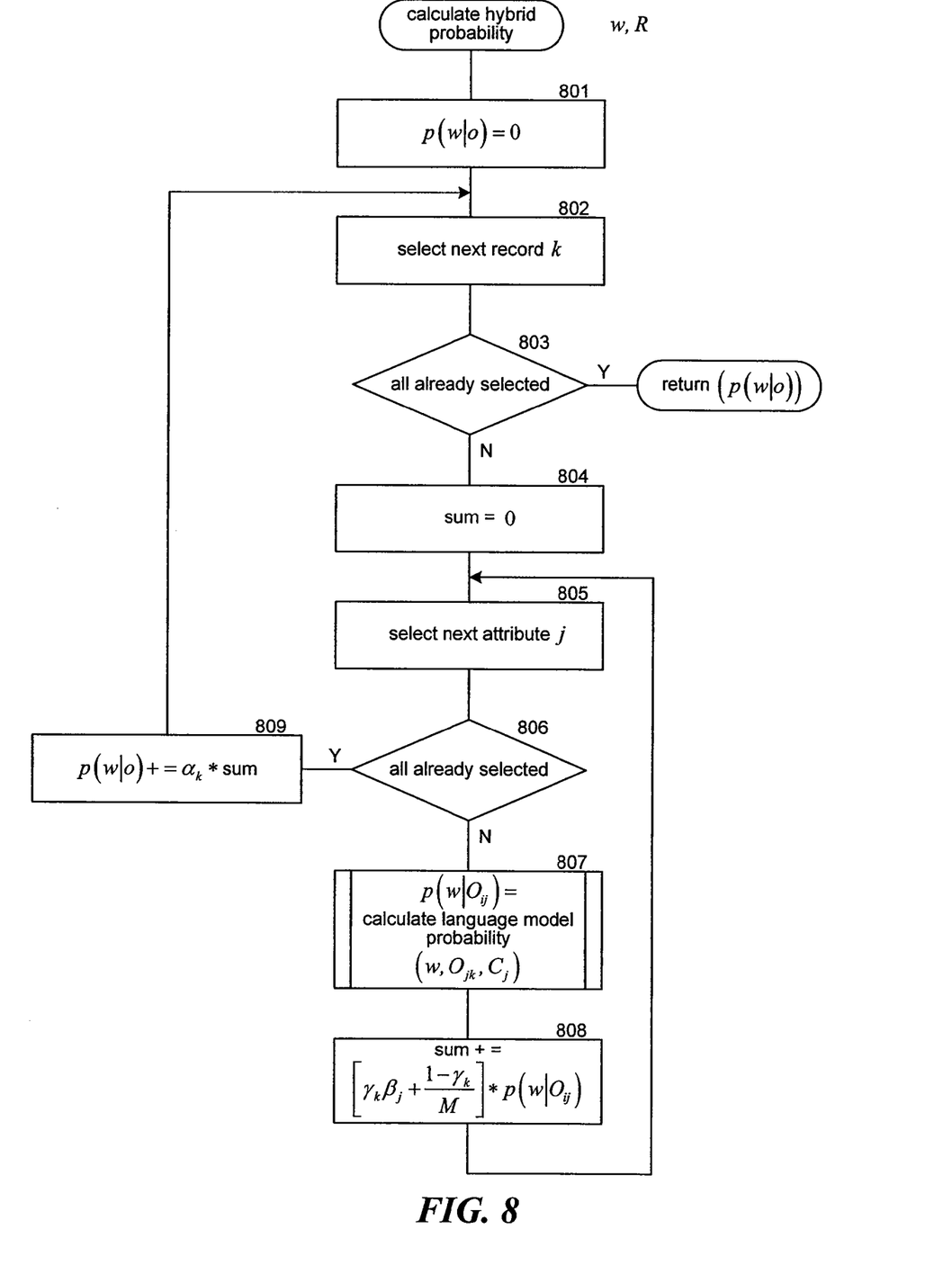
FIG. 8 is a flow diagram that illustrates the processing of the calculate hybrid probability component of the relevance system in one embodiment.

FIG. 8 is a flow diagram that illustrates the processing of the calculate hybrid probability component of the relevance system in one embodiment. The component is passed a term and an object and calculates the probability that the object is relevant to the term. In block 801, the component initializes the probability to zero. In blocks 802-809, the component loops selecting each record for the object and each attribute within each record to accumulate the probability for the object. In block 802, the component selects the next record of the object. In decision block 803, if all the records have already been selected, then the component returns the probability of the object, else the component continues at block 804. In block 804, the component initializes a sum of the contribution of the probabilities of the attributes of the selected record to zero. In block 805, the component selects the next attribute of the selected record. In decision block 806, if all the attributes of the selected record have already been selected, then the component continues at block 809, else the component continues at block 807. In block 807, the component invokes the calculate language model probability component to calculate the probability that a language model of the attribute will generate the term. In block 808, the component aggregates the probabilities of the attributes weighted by the importance of the attributes adjusted by the attribute accuracy and then loops to block 805 to select the next attribute. In block 809, the component aggregates the sum of the attributes weighted by the record accuracy into the probability for the object and then loops to block 802 to select the next record.

Figure 9:
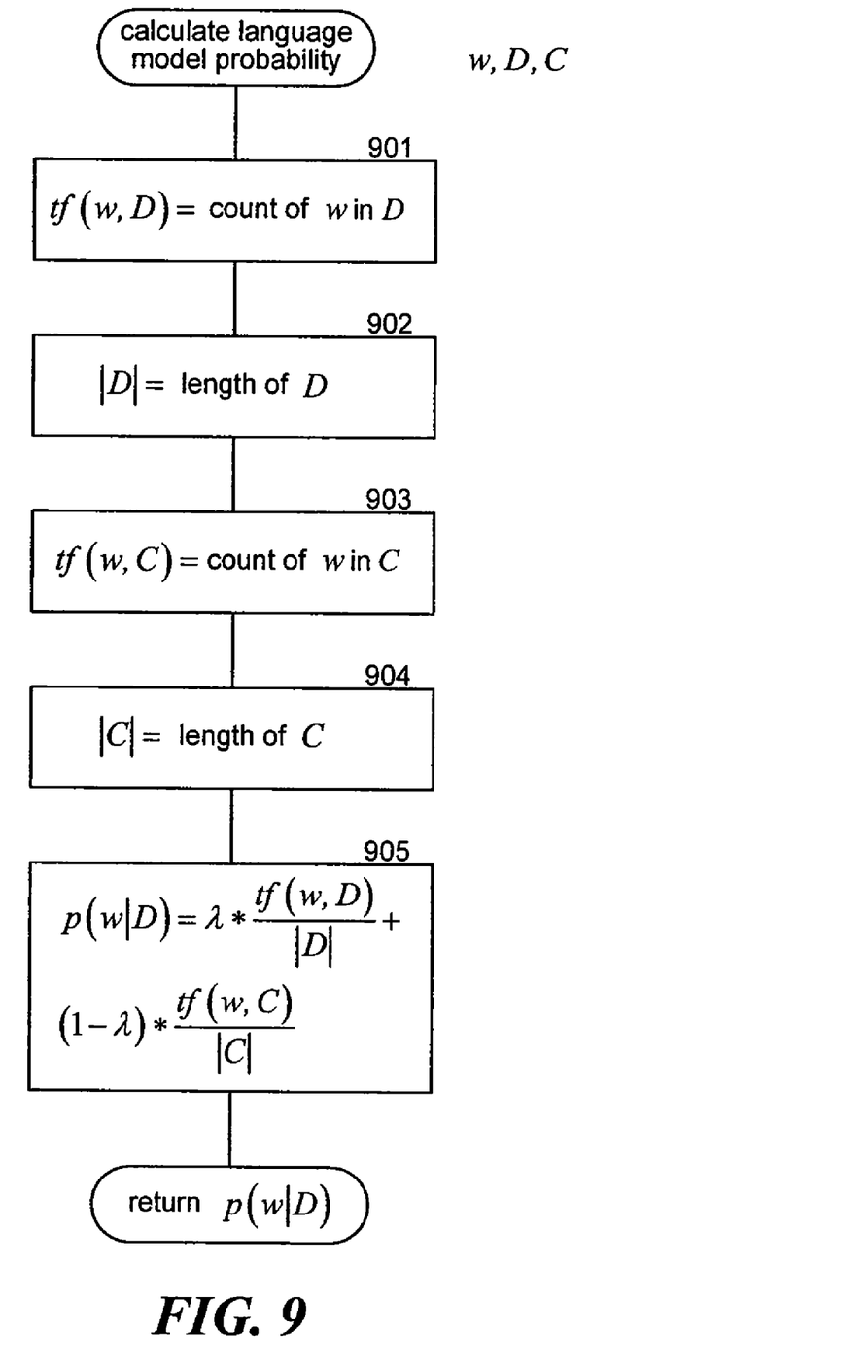
FIG. 9 is a flow diagram that illustrates the processing of the calculate language model probability component of the relevance system in one embodiment.

FIG. 9 is a flow diagram that illustrates the processing of the calculate language model probability component of the relevance system in one embodiment. The component is passed a term, a document, and a collection of documents and determines the probability that a language model of the document will generate the term. In block 901, the component counts the number of occurrences of the term within the document. In block 902, the component counts the number of occurrences of all terms within the document. In block 903, the component counts the number of occurrences of the term within the collection of documents. In block 904, the component counts the number of occurrences of all terms within the collection of documents. In block 905, the component calculates the probability using Equation 3 and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, a system may extract object information from web pages using conventional techniques combined with factoring in the accuracy of the data source. The conventional techniques may include data record extraction as described in Liu, B., Grossman, R., and Zhai, Y., "Mining Data Records in Web Pages," ACM SIGKDD International Conference on Knowledge Discovery and Data Mining, 2003; Wang, J. and Lochovsky, F. H., "Data Extraction and Label Assignment for Web Databases," World Wide Web Conference, 2003; Lerman, K., Getoor, L., Minton, S., and Knoblock, C. A., "Using the Structure of Web Sites for Automatic Segmentation of Tables," ACM SIGMOD Conference, 2004; Tejada, S., Minton, C. A., and Knoblock, A., "Learning Domain-Independent String Transformation Weights for High Accuracy Object Identification," ACM SIGKDD International Conference on Knowledge Discovery and Data Mining, 2002; and Zhu, J. Nie, Z., Wen, J., Zhang, B., and Ma, W., "2D Conditional Random Fields for Web Information Extraction," Proceedings of the $22^{nd}$ International Conference on Machine Learning, 2005. These conventional techniques can weight the contribution of each data source according to its accuracy. Also, when determining whether an object is relevant to a query, the relevance system may use a conventional technique for determining a likelihood that the object is relevant to the query augmented by factoring in the accuracy of data sources of records of the object. Accordingly, the invention is not limited except as by the appended claims.

We claim:

1. A computing system with a processor and a memory for determining relevance of an object to a target term, the object being a product, comprising:

a component that retrieves a plurality of web pages containing a description of the object, each description including terms used to describe the object;

a component that generates a collection of records of terms relating to the object, the collection including a record generated from each of the plurality of retrieved web pages, each record including a plurality of terms, each record of the collection being generated by extracting from a retrieved web page terms used to describe the object, such that the terms extracted from that retrieved web page compose the record of terms for that retrieved web page;

a component that, for each record of the collection of records of terms relating to the object, determines a language model probability for that record generating the target term, the language model probability for that record generating the target term being a weighted summation of a number of occurrences of the target term in the record divided by a number of occurrences of all terms in the record and a number of occurrences of the target term in the collection of the records divided by a number of occurrences of all terms in the collection of the records as represented by the following equation:

$$P(w|D) = \lambda \cdot \frac{tf(w,D)}{|D|} + (1-\lambda) \cdot \frac{tf(w,C)}{|C|}$$

where |D| represents the number of occurrences of terms in record D, tf(w,D) represents the number of occurrences of the target term w in record D, C represents the number of occurrences of terms in the collection C of records, tf(w,C) represents the number of occurrences of target term w in the collection C of records, and λ represents a parameter with a value greater than 0 and less than 1; and a component that calculates the relevance of the object to the target term based on a summation of the language model probability of each of the plurality of the records wherein the components are implemented as computer-executable instructions stored in the memory for execution by the processor.

2. The computing system of claim 1 wherein each record is from a data source having an accuracy and wherein the relevance factors in the accuracy of the data sources of the record.

3. The computing system of claim 2 wherein the accuracy represents accuracy of records of the data source.

4. The computing system of claim 2 wherein the accuracy represents accuracy of attributes of the records of the data source.

5. The computing system of claim 1 wherein the component that determines the relevance generates a summation of the language model probability according to the following equation:

$$p(w|o) = \sum_{k=1}^{K} (\alpha_k P(w|R_k))$$

where o represents the object, $P(w|R_k)$ represents the probability of generating the target term w from the record $R_k$, K is the number of records for the object o, and $\alpha_k$ is the record accuracy of record k such that $$\sum_k \alpha_k = 1.$$

6. The computing system of claim 1 wherein the component that determines a language model probability factors in probability from attributes of each record.

7. The computing system of claim 6 wherein each attribute of a record is represented as a separate document comprising terms of the attribute.

8. The computing system of claim 6 wherein the determined language model probability is based on accuracy of records and accuracy of attributes of a data source.

9. The computing system of claim 6 wherein the determined language model probability is based on importance of each attribute.

10. The computing system of claim 6 wherein a contribution of each attribute to the determined language model probability for a record factors in importance of each attribute based on the accuracy of the attributes.

11. The computing system of claim 1 wherein the component that determines the relevance factors in a probability of each record generated according to the following equation:

$$P(w|o) = \sum_{k=1}^{K} \left( \alpha_k \gamma_k \sum_{j=1}^{M} \beta_j P(w|O_{jk}) \right)$$

where $\gamma_k$ represents an attribute accuracy of record k, $\alpha_k \gamma_k$ represents a normalized accuracy of both a record accuracy $\alpha_k$ and attribute accuracy $\gamma_k$ of record k such that $$\sum_k \alpha_k \gamma_k = 1,$$

K represents the number of records, M represents the number of attributes, $\beta_j$ represents the importance of the attribute j such that $$\sum_j \beta_j = 1, O_{jk}$$

represents the value of the attribute j of the record k, and $P(w|O_{jk})$ represents the language model probability of generating term w from the attribute j of record k.

* * * * *

UNITED STATES PATENT AND TRADEMARK OFFICE
CERTIFICATE OF CORRECTION

| | |
|---|---|
| PATENT NO. | : 8,001,130 B2 |
| APPLICATION NO. | : 11/459857 |
| DATED | : August 16, 2011 |
| INVENTOR(S) | : Ji-Rong Wen et al. |

It is certified that error appears in the above-identified patent and that said Letters Patent is hereby corrected as shown below:

In column 5, line 55-56, delete "parameters" and insert -- parameter $\lambda$ --, therefor.

In column 11, line 27, in Claim 1, delete "C" and insert -- $|C|$ --, therefor.

Signed and Sealed this
Fourth Day of October, 2011

David J. Kappos
*Director of the United States Patent and Trademark Office*